(No Model.)
S. T. OWENS.
APPARATUS FOR SHEARING METALS.
No. 426,677. Patented Apr. 29, 1890.
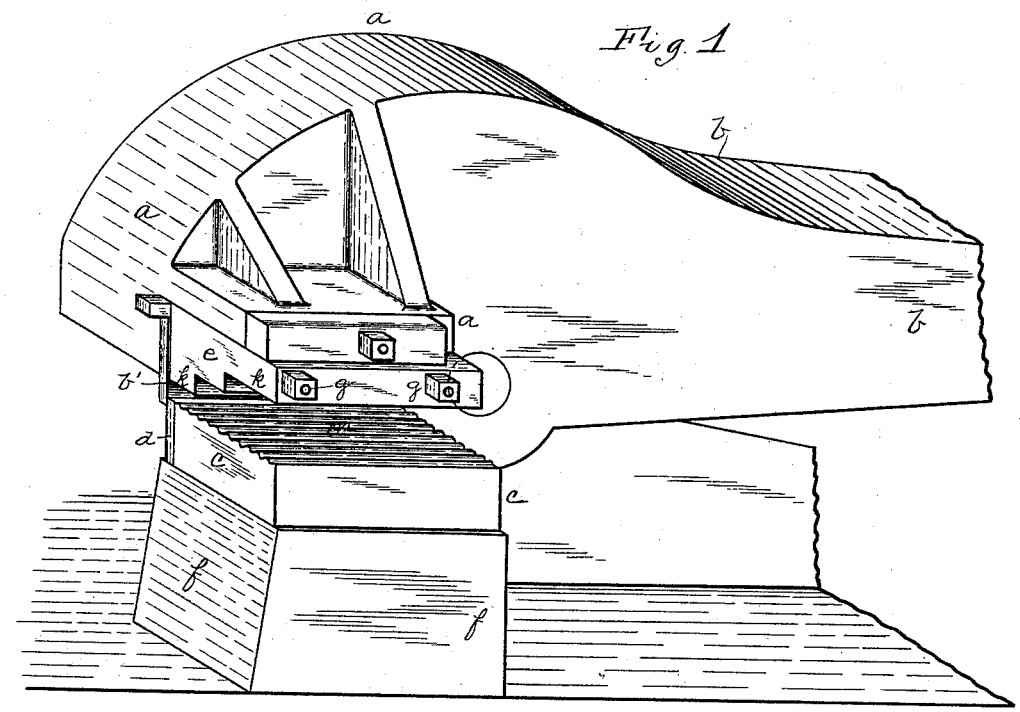
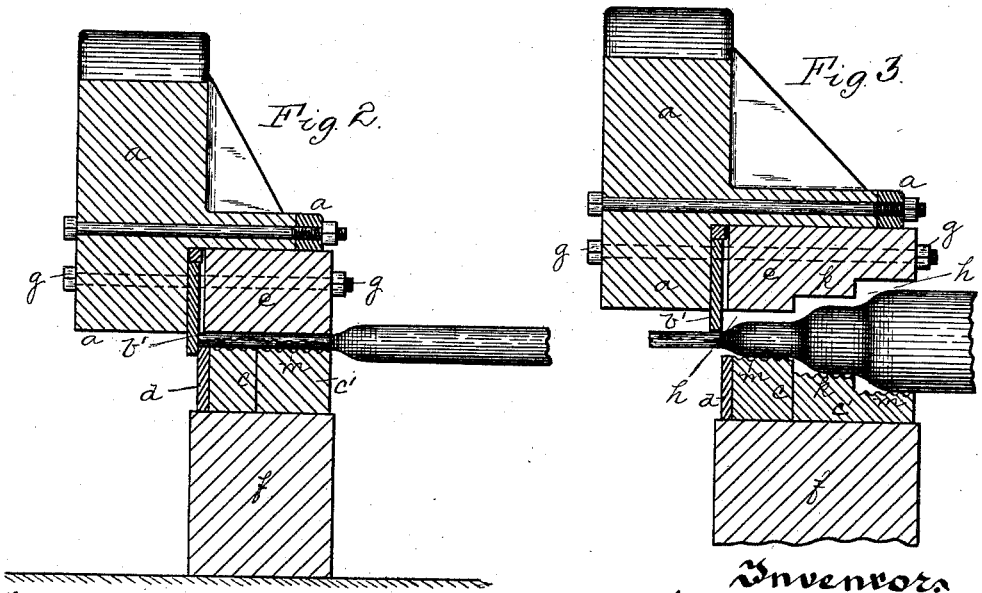
Witnesses:
J. N. Cooke
Robt. D. Totten
Inventor
Samuel T. Owens
By James D. Ray
Attorneys

UNITED STATES PATENT OFFICE.

SAMUEL T. OWENS, OF PITTSBURG, PENNSYLVANIA.

APPARATUS FOR SHEARING METALS.

SPECIFICATION forming part of Letters Patent No. 426,677, dated April 29, 1890.

Application filed February 14, 1890. Serial No. 340,416. (No model.)

*To all whom it may concern:*

Be it known that I, SAMUEL T. OWENS, a resident of Pittsburg, in the county of Allegheny and State of Pennsylvania, have invented a new and useful Improvement in Apparatus for Shearing Metals; and I do hereby declare the following to be a full, clear, and exact description thereof.

My invention relates to apparatus for shearing metals, and especially to apparatus for shearing wrought-metal tubing or pipe and forming scrap therefrom. In the manufacture of wrought-metal pipe they are cut to a common length, generally about eighteen feet, and in order to form this length of pipe it is necessary to cut from the ends thereof pieces varying from six inches to two or three feet, according to the elongation of the metal in forming the pipe, while it often occurs that on account of the pipe-balls sticking within the pipe part only of the skelp is welded into the pipe, and it is necessary to cut out the ball, and very often short lengths of skelp or pipe are thus formed which cannot be welded into pipe or are not of sufficient length to be utilized for that purpose, and in this way a large amount of scrap is formed in all tube-manufactories. The tube-scrap is in the form of cylinders of various diameters and lengths, and it is very difficult to utilize it as scrap, as no efficient way has heretofore been provided for breaking it down and shearing it into ordinary small scrap, and consequently this tube-scrap can be purchased at from two to three dollars per ton less than the ordinary flat plate or like scrap.

The object of my invention is to provide suitable dies for both flattening or breaking down this tube-scrap and cutting it into proper sizes for the formation of the ordinary run of piles or billets, and thus utilize it in the making of plates or bars, and so to provide an apparatus for bringing this tube-scrap to the ordinary scrap form at practically no extra expense.

My invention consists, generally stated, in combining with an anvil having a shearing-knife or die at one edge thereof a shearing-knife reciprocating above the same and carrying a flattening or breaking-down die above the anvil, so that as the pipe is fed under the movable anvil or squeezer it is first flattened or broken down, and is then in condition to be fed to the shears, the pipe being thus fed forward, so that at each stroke the part previously flattened is sheared off and the body of the pipe back of it is crushed or broken down ready to be sheared into scrap, as will be hereinafter more particularly described.

To enable others skilled in the art to make and use my invention, I will describe the same more fully, referring to the accompanying drawings, in which—

Figure 1 is a perspective view of apparatus embodying my invention, and Figs. 2 and 3 are cross-sections of two different forms of the shears and squeezers illustrating the operation thereof.

Like letters of reference indicate like parts in each.

My invention is illustrated in connection with the ordinary crocodile-shears, as that form of shears is well adapted for the purpose, the shears having the movable jaw $a$, which is operated by the lever $b$ from an engine or by other suitable power-connections, the jaw $a$ carrying the ordinary shearing-knife $b'$. At one side of the same is the stationary anvil $c$, resting on the bed $f$, to which the stationary shearing-knife $d$ is secured, this anvil, however, being made larger and stronger than the ordinary shear-holder, as it acts also as a stationary anvil in connection with the flattening-die $e$. If desired, a supplemental block corresponding in size to the work to be done, whether large or small, may be employed with the anvil $c$, as at $c'$. The flattening-die $e$ may either be cast as part of the jaw $a$, or, as preferred by me, may be formed as a separate piece therefrom and secured thereto by bolts $g$. It, however, reciprocates with the jaw $a$.

It will be noticed in Fig. 3 that the die $e$ does not extend down to the anvil $c$, but that there is a space $h$ between the same, this being left for the pipe which is crushed between the die $e$ and the anvil $c$, and generally corresponding to double the thickness of the pipe, so that as the pipe is flattened or broken down between the die $e$ and anvil $c$ there will be space left for the two thicknesses of metal as the two faces of the pipe are forced in contact. The die *e* and anvil *c* may simply have parallel faces, as shown in Fig. 2; but I prefer to form the faces of one or both stepped, as at *k*, so that when a pipe of large diameter is fed in it will be first broken down part way, and this continued as it is fed in, until it is entirely flattened and ready for shearing, so providing in the same dies for breaking down all sizes of pipe. In Fig. 1 the upper die is stepped, while in Fig. 3 both dies are stepped. The anvil *c* is also preferably ribbed or corrugated, as at *m*, to give a greater hold on the metal pipe.

In the use of the combined crushing-die and shears above described the pipe is fed by the operator between the crushing-die and the anvil *c*, and as the die *e* descends it forces down the end of the pipe, breaking it down and forcing the top and bottom portions toward each other, and as the pipe is fed in farther the edges are brought closer to each other until they are forced into contact, as shown. As the jaw rises the operator then pushes forward the pipe until the flattened portion at the front end thereof is fed between the shearing-knives *b′ d* and is sheared off, the pipe being thus flattened and the scrap sheared from the flattened end thereof at each stroke of the upper die until the entire pipe is crushed or broken down and reduced to scrap. The pipe is not only flattened out and brought into condition for shearing, but instead of shearing the single plate the shears act upon the two thicknesses of metal, and the metal is thus crushed and cut into any suitable sizes for scrap desired, the operation being rapid and but little labor being required for the purpose. In this way any pipe, no matter what size, may be crushed and brought into shape for use in the formation of piles or billets, and may be flattened out so as to be in the best form for packing in the forming of the piles or fagots, as has been practically proven by the use of the dies.

The apparatus is simple in construction, requiring only the addition of the flattening or breaking-down dies to the ordinary crocodile-shears, and it solves the problem of the utilization of this tube-scrap for ordinary fagoting or piling purposes.

What I claim as my invention, and desire to secure by Letters Patent, is—

1. The combination of an anvil having a shearing-knife secured thereto and a reciprocating shear above the same, carrying a die extending over the anvil and forming therewith flattening or breaking-down dies, substantially as and for the purposes set forth.

2. The combination of an anvil having a shearing-knife secured thereto and a reciprocating shear above the same, carrying a die extending over the anvil and forming therewith flattening or breaking-down dies, and steps formed in said dies to provide for the gradual flattening of the pipe, substantially as and for the purposes set forth.

3. The combination of an anvil having a shearing-knife secured thereto and a reciprocating shear above the same, carrying a die extending over the anvil and forming therewith flattening or breaking-down dies, the top face of said anvil being ribbed or corrugated, substantially as and for the purposes set forth.

In testimony whereof I, the said SAMUEL T. OWENS, have hereunto set my hand.

SAMUEL T. OWENS.

Witnesses:
JAMES I. KAY,
J. N. COOKE.